(12) United States Patent
Jiang et al.

(10) Patent No.: US 12,263,749 B2
(45) Date of Patent: Apr. 1, 2025

(54) BATTERY SYSTEM OF VEHICLE, CHARGING AND DISCHARGING METHOD, AND VEHICLE

(71) Applicant: WUHAN LOTUS CARS CO., LTD., Hubei (CN)

(72) Inventors: Guanfeng Jiang, Zhejiang (CN); Bin Wang, Zhejiang (CN); Tao Sui, Zhejiang (CN)

(73) Assignee: WUHAN LOTUS CARS CO., LTD., Wuhan (CN)

(*) Notice: Subject to any disclaimer, the term of this patent is extended or adjusted under 35 U.S.C. 154(b) by 595 days.

(21) Appl. No.: 17/616,182

(22) PCT Filed: May 29, 2020

(86) PCT No.: PCT/CN2020/093411
§ 371 (c)(1),
(2) Date: Dec. 2, 2021

(87) PCT Pub. No.: WO2020/244465
PCT Pub. Date: Dec. 10, 2020

(65) Prior Publication Data
US 2022/0314833 A1   Oct. 6, 2022

(30) Foreign Application Priority Data
Jun. 3, 2019 (CN) .......................... 201910477476.7

(51) Int. Cl.
*H02J 7/00* (2006.01)
*B60L 3/00* (2019.01)
(Continued)

(52) U.S. Cl.
CPC ............ *B60L 53/66* (2019.02); *B60L 3/0046* (2013.01); *B60L 58/12* (2019.02); *B60L 58/18* (2019.02);
(Continued)

(58) Field of Classification Search
CPC ............... B60L 53/66; B60L 3/0046; B60L 2240/547; B60L 58/12; B60L 58/18;
(Continued)

(56) References Cited

U.S. PATENT DOCUMENTS 6,967,463 B1    11/2005  Gordon et al.
2019/0126761 A1*  5/2019  Verbridge ............... B60L 53/11

FOREIGN PATENT DOCUMENTS

CN    2360295 Y     1/2000
CN    104092266 A  10/2014
(Continued)

OTHER PUBLICATIONS

International Search Report of PCT Patent Application No. PCT/CN2020/093411 issued on Aug. 26, 2020.

*Primary Examiner* — Zixuan Zhou

(57) ABSTRACT

A battery system of a vehicle, a charging and discharging method, and a vehicle. The system includes an energy storage apparatus (1) and a direct current (DC) charging and discharging interface (2), where the energy storage apparatus (1) includes a first battery pack (17) and a second battery pack (18), and a first inter-battery switch (11) and a second inter-battery switch (12) are disposed between adjacent battery packs; an incoming line terminal (111) of the first inter-battery switch (11) is connected to a first electrode of the first battery pack (17); a second outgoing line terminal (113) of the second inter-battery switch (12) is connected to a second electrode of the energy storage apparatus (1); and a first electrode of the DC charging and discharging interface (2) is connected to the first electrode of the energy storage apparatus (1).

12 Claims, 7 Drawing Sheets

(51) Int. Cl.
*B60L 53/66* (2019.01)
*B60L 58/12* (2019.01)
*B60L 58/18* (2019.01)
*B60L 58/19* (2019.01)

(52) U.S. Cl.
CPC ............ *B60L 58/19* (2019.02); *H02J 7/0024* (2013.01); *H02J 7/0048* (2020.01); *H02J 7/007* (2013.01); *B60L 2240/547* (2013.01)

(58) Field of Classification Search
CPC ..... B60L 58/19; H02J 7/0024; H02J 7/00048; H02J 7/007
USPC ............................................ 320/109; 701/22
See application file for complete search history.

(56) References Cited

FOREIGN PATENT DOCUMENTS

| | | |
|---|---|---|
| CN | 205097971 U | 3/2016 |
| CN | 106374560 A | 2/2017 |
| CN | 107658925 A | 2/2018 |
| CN | 108429307 A | 8/2018 |
| CN | 208855460 U | 5/2019 |

\* cited by examiner

BATTERY SYSTEM OF VEHICLE, CHARGING AND DISCHARGING METHOD, AND VEHICLE

TECHNICAL FIELD

The present disclosure relates to the technical field of batteries, and specifically, to a battery system of a vehicle, a charging and discharging method, and a vehicle.

BACKGROUND

In recent years, the development of new energy vehicles is vigorously promoted, which also greatly drives the development of power batteries. Therefore, safety of power batteries is becoming more important. In order to ensure the safety of the power batteries during use and after-sales maintenance, manual service disconnect (MSD) has become a mainstream configuration of the power batteries.

With the popularity of electric vehicles, a passenger vehicle gradually began to use a battery system of a high-voltage platform (for example, 800 V platform). However, there are two specifications of charging piles on the market (for example, 400 V low-voltage platform and 800 V high-voltage platform). As a result, an electric vehicle with a battery of the high-voltage platform cannot be charged by a low-voltage charging pile. This reduces convenience of the vehicle, and cannot meet a use demand of a user, resulting in a decline of product competitiveness.

At present, when an internal local fault (such as aging of a unit cell, overvoltage, or undervoltage) occurs on the battery system of the passenger vehicle, for the safety of the vehicle and a driver, the system cannot be discharged, resulting in loss of power or breakdown of the vehicle. In this case, only situ waiting for rescue or towing is feasible, which reduces the safety of the vehicle and cannot meet the use demand of the user, resulting in the decline of product competitiveness.

When a high-voltage battery system (for example, the 800 V platform) is used on the passenger vehicle, but a power-driven device uses a low-voltage platform (for example, the 400 V platform), discharging of a partial voltage (for example, 400 V) needs to be performed.

At present, other similar inventions for realizing switching between different voltage platforms adopt a method for turning on and off a relay, a contactor, or other power relays, resulting in a risk of an internal short circuit.

Therefore, it is urgent to propose a battery system of a vehicle, a charging and discharging method, and a vehicle, to switch a battery system to a fault-free low-voltage mode in case of a local battery fault, such that a battery can output partial power to continue to drive the vehicle, and perform charging or discharging based on different electricity or charging demands.

SUMMARY

To resolve the problem in the prior art, the present disclosure provides a battery system of a vehicle, including an energy storage apparatus and a direct current (DC) charging and discharging interface that are connected to each other, where the energy storage apparatus includes at least a first battery pack and a second battery pack, and an inter-battery switch is disposed between adjacent battery packs; and a first electrode of the DC charging and discharging interface is separately connected to a first electrode of the energy storage apparatus and one terminal of the inter-battery switch, and a second electrode of the DC charging and discharging interface is separately connected to a second electrode of the energy storage apparatus and another terminal of the inter-battery switch.

Further, the inter-battery switch includes a first inter-battery switch and a second inter-battery switch, and both the first inter-battery switch and the second inter-battery switch are single-pole double-throw (SPDT) switches; and an incoming line terminal of the first inter-battery switch is connected to a first electrode of the first battery pack, a first outgoing line terminal of the first inter-battery switch is connected to the first electrode of the DC charging and discharging interface, and a second outgoing line terminal of the first inter-battery switch is connected to a first outgoing line terminal of the second inter-battery switch; and a second outgoing line terminal of the second inter-battery switch is connected to the second electrode of the DC charging and discharging interface, and an incoming line terminal of the second inter-battery switch is connected to a second electrode of the second battery pack.

Further, the system includes a first relay, where one terminal of the first relay is connected to the second electrode of the DC charging and discharging interface, and the other terminal of the first relay is separately connected to the second electrode of the energy storage apparatus and a second outgoing line terminal of the second inter-battery switch of each battery pack; or one terminal of the first relay is separately connected to the second electrode of the DC charging and discharging interface and a second outgoing line terminal of the second inter-battery switch of each battery pack, and the other terminal of the first relay is connected to the second electrode of the energy storage apparatus.

Further, the system includes a second relay, where one terminal of the second relay is connected to the first electrode of the DC charging and discharging interface, and the other terminal of the second relay is separately connected to the first electrode of the energy storage apparatus and a first outgoing line terminal of the first inter-battery switch of each battery pack; or one terminal of the second relay is separately connected to the first electrode of the DC charging and discharging interface and a first outgoing line terminal of the first inter-battery switch of each battery pack, and the other terminal of the second relay is connected to the first electrode of the energy storage apparatus.

Further, the system includes a third relay, where one terminal of the third relay is connected to one terminal of the second relay, and the other terminal of the third relay is connected to the first outgoing line terminal of the first inter-battery switch; or one terminal of the third relay is connected to the other terminal of the second relay, and the other terminal of the third relay is connected to the first outgoing line terminal of the first inter-battery switch.

Further, the system includes a fourth relay, where one terminal of the fourth relay is connected to one terminal of the first relay, and the other terminal of the fourth relay is connected to the second outgoing line terminal of the second inter-battery switch; or one terminal of the fourth relay is connected to the other terminal of the first relay, and the other terminal of the fourth relay is connected to the second outgoing line terminal of the second inter-battery switch.

Further, the DC charging and discharging interface includes a discharging interface and a charging interface;
  a first electrode of the discharging interface is connected to a first electrode of the charging interface; and
  a second electrode of the discharging interface is connected to a second electrode of the charging interface.

Further, the DC charging and discharging interface further includes a fifth relay;
  one terminal of the fifth relay is connected to the second electrode of the charging interface, and the other terminal of the fifth relay is separately connected to the second electrode of the discharging interface and the second electrode of the energy storage apparatus.

Further, the DC charging and discharging interface further includes a sixth relay;
  one terminal of the sixth relay is connected to the first electrode of the charging interface, and the other terminal of the sixth relay is separately connected to the first electrode of the discharging interface and the first electrode of the energy storage apparatus.

Further, the system includes a control unit, where
  the control unit is separately connected to the energy storage apparatus, the first inter-battery switch, the second inter-battery switch, the first relay, the second relay, the third relay, the fourth relay, the fifth relay, and/or the sixth relay to control opening or closing of the first inter-battery switch, the second inter-battery switch, the first relay, the second relay, the third relay, the fourth relay, the fifth relay, and/or the sixth relay, such that the energy storage apparatus is charged or discharged in one of a high-voltage charging or discharging mode, a low-voltage charging or discharging mode, and a protective charging or discharging mode.

Further, the control unit includes a battery detection apparatus, where
  the battery detection apparatus is connected to each battery pack, and configured to detect a working status of the battery pack; and
  the control unit is configured to receive charging and discharging parameter information sent by an external charging and discharging apparatus and working status information sent by the battery detection apparatus, and control opening or closing of the first inter-battery switch, the second inter-battery switch, the first relay, the second relay, the third relay, the fourth relay, the fifth relay, and/or the sixth relay based on the charging and discharging parameter information and the working status information, such that the battery pack is charged or discharged in one of the high-voltage charging or discharging mode, the low-voltage charging or discharging mode, and the protective charging or discharging mode.

Further, the battery detection apparatus is configured to detect state-of-charge (SOC) information of the battery pack; and
  the control unit is configured to detect, based on the SOC information fed back by the battery detection apparatus, whether the battery pack is fully charged, and control the fifth relay and/or the sixth relay to be opened after determining that the battery pack is fully charged.

According to another aspect, the present disclosure provides a charging and discharging method applied to the battery system of a vehicle, where the method includes:
  obtaining working status information of each battery pack; and
  controlling opening or closing of the inter-battery switch based on received charging and discharging parameter information and a working status, such that the battery pack is charged or discharged in one of a high-voltage charging or discharging mode, a low-voltage charging or discharging mode, and a protective charging or discharging mode.

Further, the inter-battery switch includes the first inter-battery switch and the second inter-battery switch, and both the first inter-battery switch and the second inter-battery switch are SPDT switches; and before the controlling opening or closing of the inter-battery switch based on received charging and discharging parameter information and a working status, such that the battery pack is charged or discharged in one of a high-voltage charging or discharging mode, a low-voltage charging or discharging mode, and a protective charging or discharging mode, the method further includes:
  obtaining current position status information corresponding to the first inter-battery switch, the second inter-battery switch, the first relay, and the second relay; and
  correspondingly, controlling opening or closing of the first inter-battery switch, the second inter-battery switch, the first relay, and the second relay based on the received charging and discharging parameter information, the working status information, and the current position status information, such that the battery pack is charged or discharged in one of the high-voltage charging or discharging mode, the low-voltage charging or discharging mode, and the protective charging or discharging mode.

Further, the working status information includes a fault status message, and the charging and discharging parameter information includes a charging pile recognition message; and
  when a voltage represented by the received charging pile recognition message is equal to a rated voltage of each battery pack, and an obtained working status of a battery pack is the fault status message, controlling the first inter-battery switch and the second inter-battery switch of the battery pack corresponding to the fault status message to be opened, controlling the first relay and the second relay to be closed, and controlling the first inter-battery switch and the second inter-battery switch of each of the other battery packs to be closed on the first outgoing line terminal and the second outgoing line terminal respectively, such that each fault-free battery pack is connected to the DC charging and discharging interface in parallel, and enters the protective charging mode for charging.

Further, when the voltage represented by the received charging pile recognition message is equal to a sum of rated voltages of all battery packs, and a working status being the fault status message is not obtained for a battery pack, controlling the first relay and the second relay to be closed, and controlling the first inter-battery switch and the second inter-battery switch of each of the other battery packs to be closed on the second outgoing line terminal and the first outgoing line terminal respectively, such that each battery pack is connected to the DC charging and discharging interface in series, and enters the high-voltage charging mode for charging.

Further, when the voltage represented by the received charging pile recognition message is equal to the rated voltage of each battery pack, and a working status being the fault status message is not obtained for a battery pack, controlling the first relay and the second relay to be closed, and controlling the first inter-battery switch and the second inter-battery switch to be closed on the first outgoing line terminal and the second outgoing line terminal respectively, such that each battery pack is connected to the DC charging and discharging interface in parallel, and enters the low-voltage charging mode for charging.

According to still another aspect, the present disclosure provides a vehicle. The vehicle is provided with the foregoing battery system of a vehicle.

The present disclosure achieves the following beneficial effects:

The present resolves a problem that a power battery of a high-voltage platform cannot be charged by a low-voltage charging pile, and a power battery of a low-voltage platform cannot be charged by a high-voltage charging pile.

The present disclosure resolves a problem that the power battery of the high-voltage platform cannot be discharged by a low voltage, and the power battery of the low-voltage platform cannot be discharged by a high voltage.

The present disclosure resolves a problem that a local battery system cannot be used due to an internal local fault.

The present disclosure avoids a short circuit in control in common invention solutions.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

Figure 1:
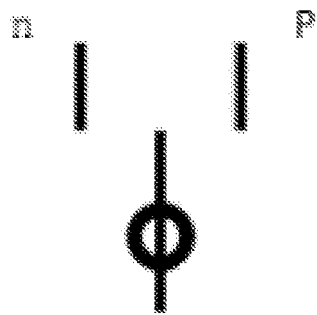
FIG. 1 a schematic diagram of an SPDT switch according to an embodiment of the present disclosure.

In the figures, 1: energy storage apparatus; and 2: DC charging and discharging interface;
11: first inter-battery switch; 12: second inter-battery switch; 13: first relay; 14: second relay; 15: third relay; 16: fourth relay; 17: first battery pack; 18: second battery pack; 21: fifth relay; and 22: sixth relay;
111: incoming line terminal; 112: first outgoing line terminal; and 113: second outgoing line terminal.

DETAILED DESCRIPTION

The embodiments of the present disclosure are described below in detail. Examples of the embodiments are shown in the accompanying drawings. The same or similar numerals represent the same or similar elements or elements having the same or similar functions throughout the specification. The embodiments described below with reference to the accompanying drawings are illustrative, which are merely intended to explain the present disclosure, rather than to limit the present disclosure.

In the description of the present disclosure, it should be understood that orientation or position relationships indicated by terms such as "upper", "lower", "top", "bottom", "inside" and "outside" are based on what are illustrated in the drawings. These terms are merely intended to facilitate and simplify the description of the present disclosure, rather than to indicate or imply that the mentioned apparatuses or elements must have a specific orientation or must be constructed and operated in a specific orientation. Therefore, these terms should not be understood as a limitation to the present disclosure. In the description of the present disclosure, "a plurality of" means two or more, unless otherwise specifically defined.

It should be noted that when an element is "connected" to another element, the connection may be a circuit connection or a communication connection.

Unless otherwise defined, all technical and scientific terms used in this specification have the same meaning as that commonly understood by a person skilled in the art of the present disclosure. The terms used in the specification of the present disclosure are merely for the purpose of describing specific implementations, and are not intended to limit the present disclosure.

FIG. 1 is a schematic diagram of an SPDT switch according to an embodiment of the present disclosure. As shown in FIG. 1, the SPDT switch has three statuses: on at position N, on at position P, and off. The SPDT switch may include an incoming line terminal, a first outgoing line terminal N, and a second outgoing line terminal P. The SPDT switch may include but is not limited to: a double-throw contactor, a double-throw relay, and a semiconductor power device with a same function, including but not limited to a multiplexer, a triode combination circuit, a MOSFET combination circuit, an IGBT combination circuit, and a SiC combination circuit.

A first relay, a second relay, a third relay, a fourth relay, a fifth relay, and a sixth relay described in the present disclosure each have only two statuses: closed and opened, and may include but are not limited contactors, relays, semiconductor power devices, or may be electronic components such as triodes, MOSFET, IGBT, and SiC.

Figure 2:
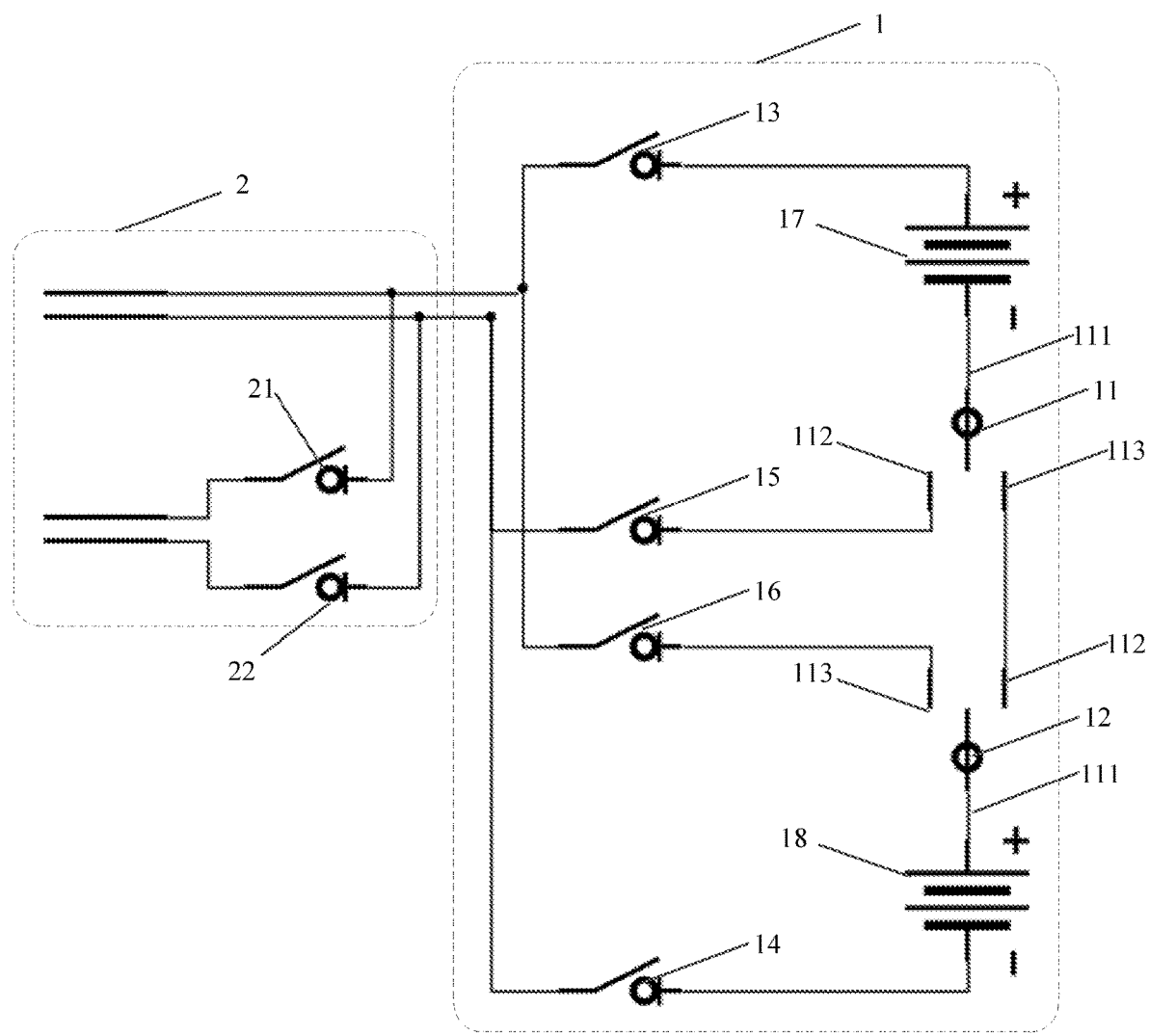
FIG. 2 is a structural diagram of a battery system of a vehicle according to an embodiment of the present disclosure.
Figure 3:
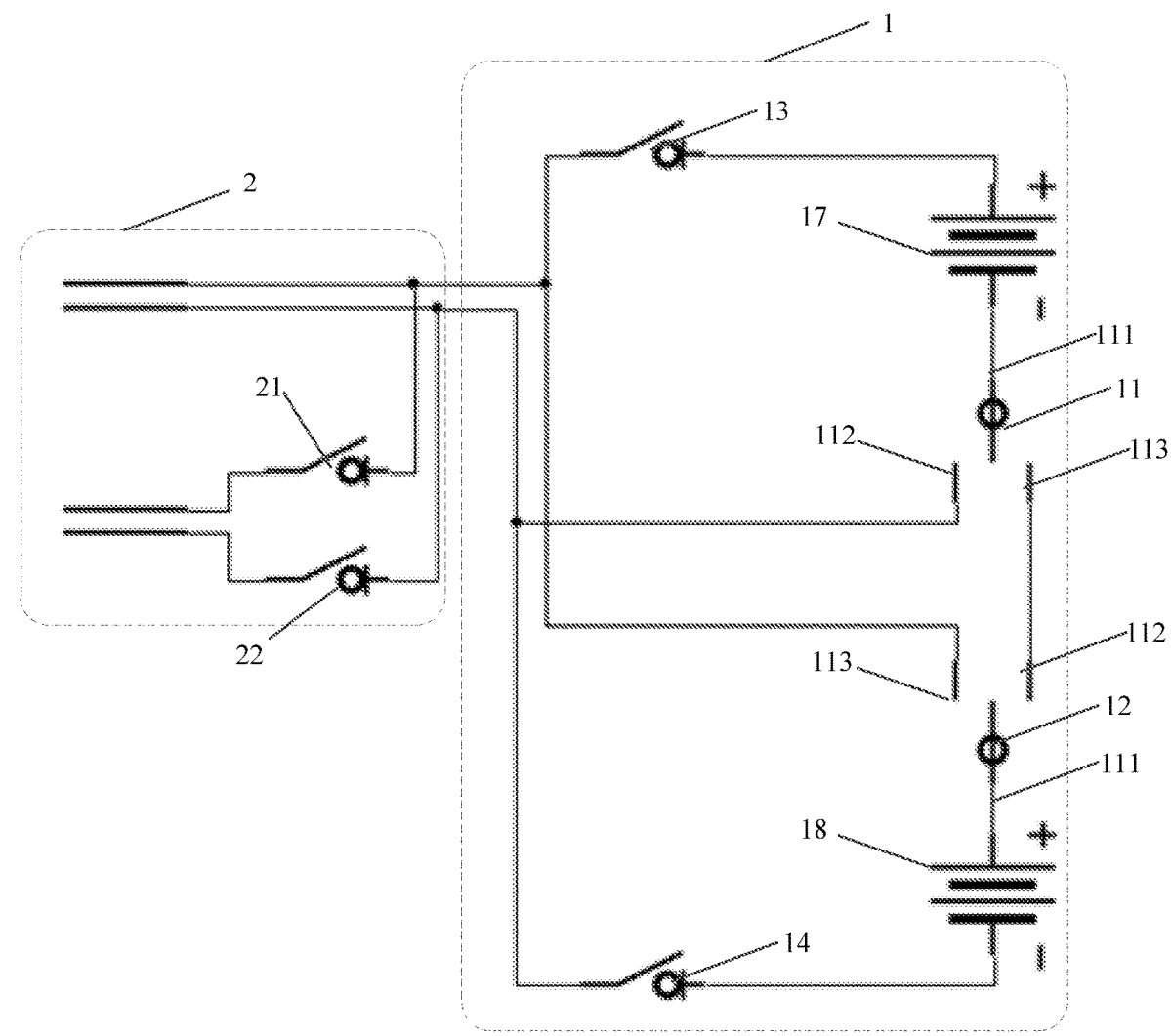
FIG. 3 is a structural diagram of another battery system of a vehicle according to an embodiment of the present disclosure.
Figure 4:
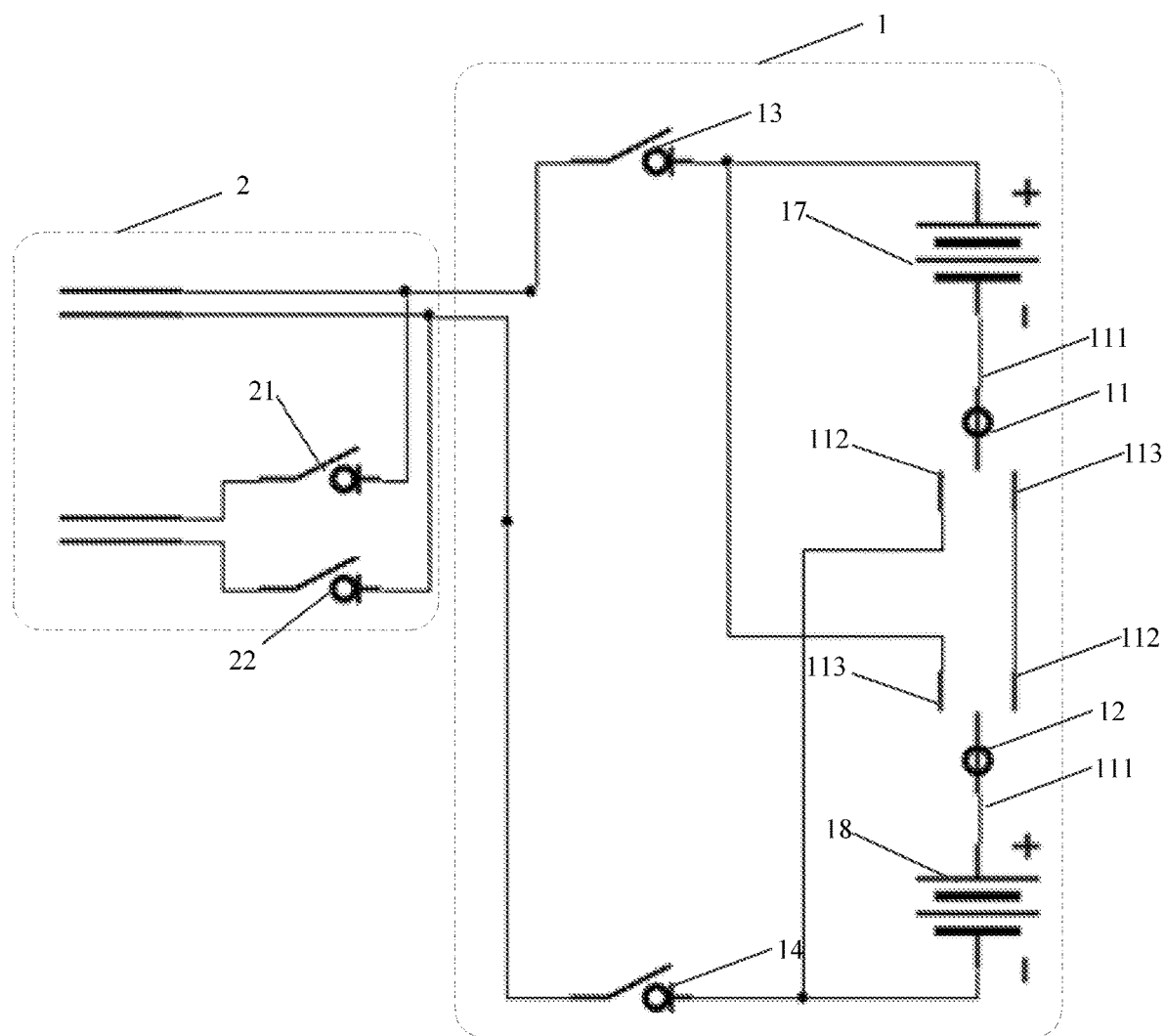
FIG. 4 is a structural diagram of still another battery system of a vehicle according to an embodiment of the present disclosure.
Figure 5:
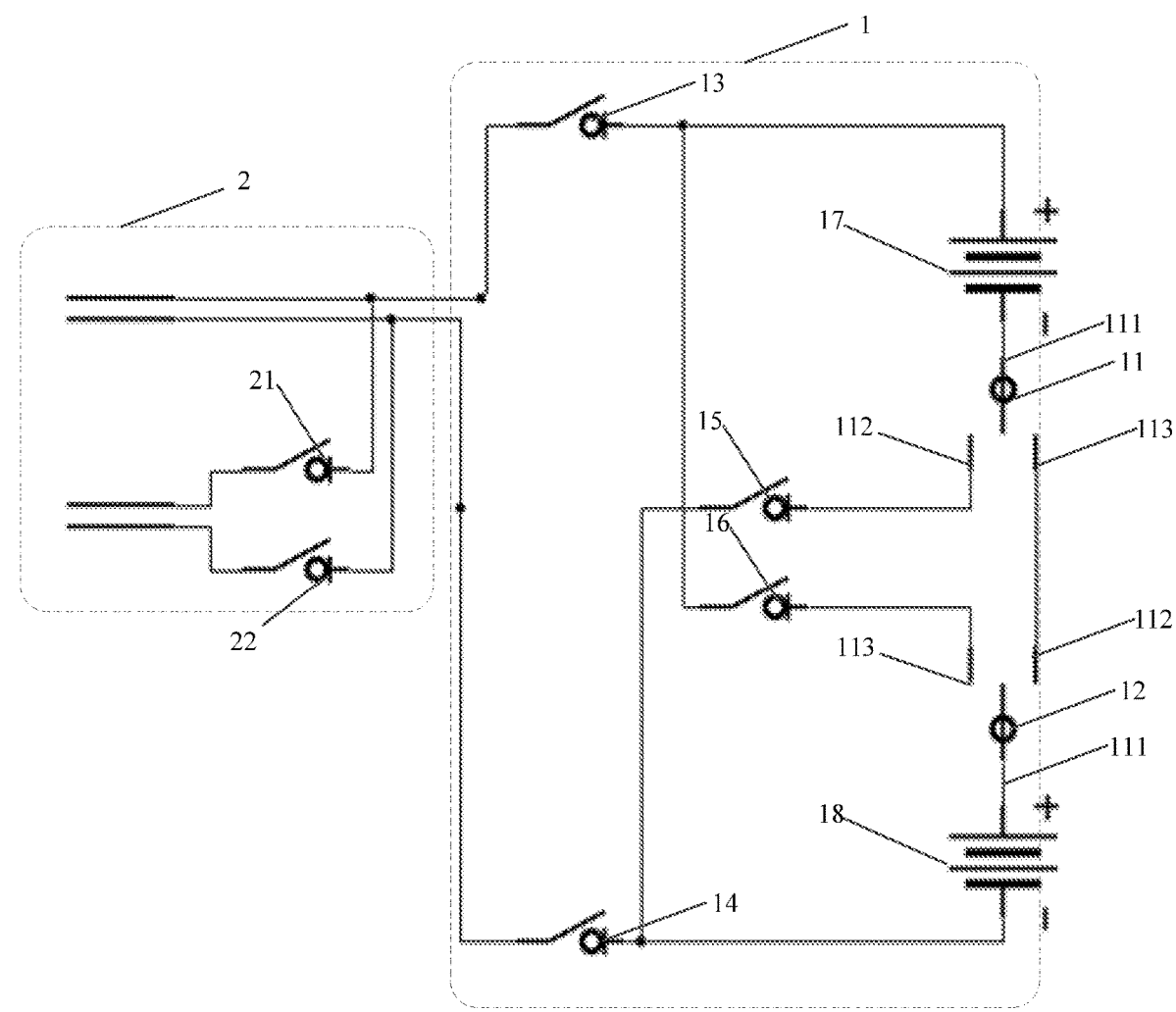
FIG. 5 is a structural diagram of yet another battery system of a vehicle according to an embodiment of the present disclosure.

FIG. 2 is a structural diagram of a battery system of a vehicle according to an embodiment of the present disclosure. FIG. 3 is a structural diagram of another battery system of a vehicle according to an embodiment of the present disclosure. FIG. 4 is a structural diagram of still another battery system of a vehicle according to an embodiment of the present disclosure. FIG. 5 is a structural diagram of yet another battery system of a vehicle according to an embodiment of the present disclosure. As shown in FIG. 2 to FIG. 5, the battery system of a vehicle in the present disclosure includes an energy storage apparatus 1 and a DC charging and discharging interface 2 that are connected to each other.

The energy storage apparatus 1 includes at least a first battery pack 17 and a second battery pack 18, and an inter-battery switch is disposed between adjacent battery packs.

A first electrode of the DC charging and discharging interface 2 is separately connected to a first electrode of the energy storage apparatus 1 and one terminal of the inter-battery switch, and a second electrode of the DC charging and discharging interface 2 is separately connected to a second electrode of the energy storage apparatus 1 and another terminal of the inter-battery switch.

Based on this embodiment, in an embodiment of this specification, the inter-battery switch includes a first inter-battery switch 11 and a second inter-battery switch 12, and both the first inter-battery switch 11 and the second inter-battery switch 12 are SPDT switches.

An incoming line terminal 111 of the first inter-battery switch 11 is connected to a first electrode of the first battery pack 17, a first outgoing line terminal 112 of the first inter-battery switch 11 is connected to the first electrode of the DC charging and discharging interface 2, and a second outgoing line terminal 113 of the first inter-battery switch 11 is connected to a first outgoing line terminal 112 of the second inter-battery switch 12; and a second outgoing line terminal 113 of the second inter-battery switch 12 is connected to the second electrode of the DC charging and discharging interface 2, and an incoming line terminal 111 of the second inter-battery switch 12 is connected to a second electrode of the second battery pack 18.

Specifically, the energy storage apparatus 1 may include at least the first battery pack 17 and the second battery pack 18. It can be understood that rated voltages of the first battery pack 17 and the second battery pack 18 may be the same or different. Preferably, the rated voltages of the first battery pack 17 and the second battery pack 18 are the same. The first battery pack 17 may include a plurality of groups of batteries that are connected in series, and each group of batteries may also include a plurality of unit cells that are connected in series. The energy storage apparatus 1 may be configured to provide electric energy for a vehicle. A rated voltage of the unit cell is not specifically limited in the embodiments of this specification, and may be specified based on actual needs. In some embodiments, the energy storage apparatus 1 may include three or more battery packs, and each two battery packs are connected by the inter-battery switch in the present disclosure.

For example, when the energy storage apparatus 1 includes the first battery pack 17, the second battery pack 18, and a third battery pack that are disposed side by side and each have a rated voltage of 400 V, an inter-battery switch A is disposed between a negative terminal of the first battery pack 17 and a positive terminal of the second battery pack 18, an inter-battery switch B is disposed between a negative terminal of the second battery pack 18 and a positive terminal of the third battery pack, a positive terminal of the first battery pack 17 is connected to a positive terminal of the DC charging and discharging interface, and a negative terminal of the third battery pack is connected to a negative terminal of the DC charging and discharging interface. When an external charging device is 400 V, the inter-battery switch A and the inter-battery switch B can be controlled to ensure that the first battery pack 17, the second battery pack 18, and the third battery pack are connected in parallel and connected to the external charging device by the DC charging and discharging interface. In this way, the first battery pack 17, the second battery pack 18, and the third battery pack are charged at a voltage of 400 V at the same time.

Specifically, the DC charging and discharging interface 2 may be configured to connect an external charging and discharging apparatus or an electric energy consuming apparatus. The external charging and discharging apparatus may be configured to charge and discharge the battery system. The external charging and discharging apparatus may be a charging pile or another charging and discharging apparatus. The electric energy consuming apparatus may be an engine, a lighting apparatus, or the like. The DC charging and discharging interface 2 can match a plug-in mode of the external charging and discharging apparatus. A specific implementation form of the DC charging and discharging interface 2 is not restrictive. The DC charging and discharging interface 2 may be set as a charging and discharging gun. The charging and discharging gun can be inserted into a charging and discharging of an electric vehicle, and is formally connected to the electric vehicle after a handshake protocol is completed.

Specifically, the DC charging and discharging interface 2 may be connected to a load or a DC charger.

Specifically, the first inter-battery switch 11 and the second inter-battery switch 12 may be configured to switch a connection or disconnection relationship between the battery packs. The battery packs may be connected in series or in parallel.

It can be understood that the first electrode and the second electrode are opposite electrodes. For example, if the first electrode is negative, the second electrode is positive.

Based on the above embodiments, in an embodiment of this specification, the system further includes a first relay 13.

One terminal of the first relay 13 is connected to the second electrode of the DC charging and discharging interface 2, and the other terminal of the first relay 13 is separately connected to the second electrode of the energy storage apparatus 1 and a second outgoing line terminal 113 of the second inter-battery switch 12 of each battery pack; or one terminal of the first relay 13 is separately connected to the second electrode of the DC charging and discharging interface 2 and a second outgoing line terminal 113 of the second inter-battery switch 12 of each battery pack, and the other terminal of the first relay 13 is connected to the second electrode of the energy storage apparatus 1.

Specifically, the first relay 13 may be configured to open or close a circuit between the second electrode of the energy storage apparatus 1 and the second electrode of the DC charging and discharging interface 2. Alternatively, the first relay 13 may be configured to open or close a circuit between a second electrode of the first battery pack 17 and the second electrode of the DC charging and discharging interface 2.

Based on the above embodiments, in an embodiment of this specification, the system further includes a second relay 14.

One terminal of the second relay 14 is connected to the first electrode of the DC charging and discharging interface 2, and the other terminal of the second relay 14 is separately connected to the first electrode of the energy storage apparatus 1 and a first outgoing line terminal 112 of the first inter-battery switch 11 of each battery pack; or one terminal of the second relay 14 is separately connected to the first electrode of the DC charging and discharging interface 2 and a first outgoing line terminal 112 of the first inter-battery switch 11 of each battery pack, and the other terminal of the second relay 14 is connected to the first electrode of the energy storage apparatus 1.

Specifically, the second relay 14 may be configured to open or close a circuit between the first electrode of the energy storage apparatus 1 and the first electrode of the DC charging and discharging interface 2. Alternatively, the second relay 14 may be configured to open or close a circuit between the first electrode of the first battery pack 17 and the first electrode of the DC charging and discharging interface 2.

Based on the above embodiments, in an embodiment of this specification, the system further includes a third relay 15.

One terminal of the third relay 15 is connected to one terminal of the second relay 14, and the other terminal of the third relay 15 is connected to the first outgoing line terminal 112 of the first inter-battery switch 11; or one terminal of the third relay 15 is connected to the other terminal of the second relay 14, and the other terminal of the third relay 15 is connected to the first outgoing line terminal 112 of the first inter-battery switch 11.

Specifically, the third relay 15 may be configured to open or close the circuit between the first electrode of the first battery pack 17 and the first electrode of the DC charging and discharging interface 2. Alternatively, the third relay 15 may be configured to open or close a circuit between the first electrode of the first battery pack 17 and the second relay 14.

Based on the above embodiments, in an embodiment of this specification, the system further includes a fourth relay 16.

One terminal of the fourth relay 16 is connected to one terminal of the first relay 13, and the other terminal of the fourth relay 16 is connected to the second outgoing line terminal 113 of the second inter-battery switch 12; or one terminal of the fourth relay 16 is connected to the other terminal of the first relay 13, and the other terminal of the fourth relay 16 is connected to the second outgoing line terminal 113 of the second inter-battery switch 12.

Specifically, the fourth relay 16 may be configured to open or close a circuit between the second electrode of the second battery pack 18 and the second electrode of the DC charging and discharging interface 2. Alternatively, the fourth relay 16 may be configured to open or close a circuit between the second electrode of the second battery pack 18 and the first relay 13.

Based on the above embodiments, in an embodiment of this specification, the DC charging and discharging interface 2 includes a discharging interface and a charging interface.

A first electrode of the discharging interface is connected to a first electrode of the charging interface.

A second electrode of the discharging interface is connected to a second electrode of the charging interface.

Specifically, the discharging interface and the charging interface may be connected in parallel, and the first electrode of the discharge interface is connected to the first electrode of each battery pack. The second electrode of the discharging interface is connected to the second electrode of each battery pack.

Based on the above embodiments, in an embodiment of this specification, the DC charging and discharging interface 2 further includes a fifth relay 21.

One terminal of the fifth relay 21 is connected to the second electrode of the charging interface, and the other terminal of the fifth relay 21 is separately connected to the second electrode of the discharging interface and the second electrode of the energy storage apparatus 1.

Specifically, the fifth relay 21 may be configured to close or open a circuit connection between the second electrode of the charging interface and the second electrode of the energy storage apparatus 1 or each battery pack.

It can be understood that the fifth relay 21 may be disposed between the second electrode of the discharging interface and the second electrode of the energy storage apparatus 1 or each battery pack.

Based on the above embodiments, in an embodiment of this specification, the DC charging and discharging interface 2 further includes a sixth relay 22.

One terminal of the sixth relay 22 is connected to the first electrode of the charging interface, and the other terminal of the sixth relay 22 is separately connected to the first electrode of the discharging interface and the first electrode of the energy storage apparatus 1.

Specifically, the sixth relay 22 may be configured to close or open a circuit connection between the first electrode of the charging interface and the first electrode of the energy storage apparatus 1 or each battery pack.

It can be understood that the sixth relay 22 may be disposed between the first electrode of the discharging interface and the first electrode of the energy storage apparatus 1 or each battery pack.

Based on the above embodiments, in an embodiment of this specification, the system further includes a control unit.

The control unit is separately connected to the energy storage apparatus 1, the first inter-battery switch 11, the second inter-battery switch 12, the first relay 13, the second relay 14, the third relay 15, the fourth relay 16, the fifth relay 21, and/or the sixth relay 22 to control opening or closing of the first inter-battery switch 11, the second inter-battery switch 12, the first relay 13, the second relay 14, the third relay 15, the fourth relay 16, the fifth relay 21, and/or the sixth relay 22, such that the energy storage apparatus 1 is charged or discharged in one of a high-voltage charging or discharging mode, a low-voltage charging or discharging mode, and a protective charging or discharging mode.

The control unit can establish a control connection to the energy storage apparatus 1, the first inter-battery switch 11, the second inter-battery switch 12, the first relay 13, the second relay 14, the third relay 15, the fourth relay 16, the fifth relay 21, and/or the sixth relay 22 separately by a controller area network (CAN) bus. The control unit can control opening or closing of the first inter-battery switch 11, the second inter-battery switch 12, the first relay 13, the second relay 14, the third relay 15, the fourth relay 16, the fifth relay 21, and/or the sixth relay 22 based on a working status of the energy storage apparatus 1 and a user demand, such that the battery pack is charged or discharged in one of the high-voltage charging or discharging mode, the low-voltage charging or discharging mode, and the protective charging or discharging mode. The control unit may be disposed on a driver side or a battery side.

Based on the above embodiments, in an embodiment of this specification, the control unit includes a battery detection apparatus.

The battery detection apparatus is connected to each battery pack, and configured to detect a working status of the battery pack.

The control unit is configured to receive charging and discharging parameter information sent by the external charging and discharging apparatus and working status information sent by the battery detection apparatus, and control opening or closing of the first inter-battery switch 11, the second inter-battery switch 12, the first relay 13, the second relay 14, the third relay 15, the fourth relay 16, the fifth relay 21, and/or the sixth relay 22 based on the charging and discharging parameter information and the working status information, such that the battery pack is charged or discharged in one of the high-voltage charging or discharging mode, the low-voltage charging or discharging mode, and the protective charging or discharging mode.

Specifically, the battery detection apparatus may be configured to monitor a communication protocol version, a type, a capacity, and a voltage of each battery pack, a vehicle identification number (VIN), and the like. The control unit can recognize a charging handshake based on the above information and a BMS recognition message (BRM) sent by a charging pile, and realize the charging handshake after recognition.

Based on the above embodiments, in an embodiment of this specification, the battery detection apparatus is further configured to detect SOC information of the battery pack.

The control unit is configured to detect, based on the SOC information fed back by the battery detection apparatus, whether the battery pack is fully charged, and control the fifth relay 21 and/or the sixth relay 22 to be opened after determining that the battery pack is fully charged.

For example, as shown in FIG. 2, the battery system of a vehicle is composed of the first battery pack 17, the second battery pack 18, the first inter-battery switch 11, the second inter-battery switch 12, the first relay 13, the second relay 14, the third relay 15, the fourth relay 16, the fifth relay 21, the sixth relay 22, the charging interface, and the discharging interface. The rated voltages of the first battery pack 17 and the second battery pack 18 each are 400 V.

When an external 800 V high-voltage charging pile is available for the system, the first inter-battery switch 11 is closed on the second outgoing line terminal 113, the second inter-battery switch 12 is closed on the first outgoing line terminal 112, the first relay 13 and the second relay 14 are closed, and the third relay 15, the fourth relay 16, the fifth relay 21, and the sixth relay 22 are opened. In this case, the system is equivalently composed of the first battery pack 17 and the second battery pack 18 that are connected in series, and a total voltage is equivalent to a sum of the voltages of the first battery pack 17 and the second battery pack 18, namely, 800 V. In this case, the voltages of the battery packs match a voltage of the external charging pile, and a charging demand can be met. In this case, if the third relay 15, the fourth relay 16, the first inter-battery switch 11, and the second inter-battery switch 12 run abnormally, no internal short circuit is caused to the system.

When an external 400 V low-voltage charging pile is available for the system, the first inter-battery switch 11 is closed on the first outgoing line terminal 112, the second inter-battery switch 12 is closed on the second outgoing line terminal 113, and the first relay 13, the second relay 14, the third relay 15, the fourth relay 16, the fifth relay 21, and the sixth relay 22 are closed. This is equivalent to that the two battery packs of a low-voltage platform are connected in parallel, and the total voltage is equal to the voltage of each battery pack, namely, 400 V. In this case, the voltage of the battery pack matches a voltage of the external charging pile, and a charging demand can be met. In this case, if the third relay 15, the fourth relay 16, the first inter-battery switch 11, and the second inter-battery switch 12 run abnormally, no internal short circuit is caused to the system.

When the system needs to be discharged in a mode of a high-voltage platform, the first inter-battery switch 11 is closed on the second outgoing line terminal 113, the second inter-battery switch 12 is closed on the first outgoing line terminal 112, the first relay 13 and the second relay 14 are closed, and the third relay 15 and the fourth relay 16 are opened. In this case, the system is equivalently composed of the first battery pack 17 and the second battery pack 18 that are connected in series, and the total voltage is equivalent to the sum of the voltages of the first battery pack 17 and the second battery pack 18, namely, 800 V. In this case, if the third relay 15 and the fourth relay 16 are abnormally closed, the system is not affected.

When an external low-voltage discharging voltage available for the system is 400 V, the first inter-battery switch 11 is closed on the first outgoing line terminal 112, the second inter-battery switch 12 is closed on the second outgoing line terminal 113, and the first relay 13, the second relay 14, the third relay 15, and the fourth relay 16 are closed. This is equivalent to that the two battery packs of the low-voltage platform are connected in parallel, and the total voltage is equal to the voltage of each battery pack, namely, 400 V. In addition, the voltage of the battery pack matches a voltage of an external low-voltage power-driven device, and a discharging demand can be met.

When an internal problem such as a local insulation problem or a cell problem occurs on a battery pack, if it is determined by the control unit that the problem occurs on the first battery pack 17 or the second battery pack 18, the system can be correspondingly converted into a low-voltage 400 V platform in the protective charging or discharging mode.

If the problem occurs on the first battery pack 17, the first inter-battery switch 11 is opened or closed on the second outgoing line terminal 113, the second inter-battery switch 12 is closed on the second outgoing line terminal 113, the second relay 14 and the fourth relay 16 are closed, and the first relay 13 and the third relay 15 are opened. Therefore, the system can be charged and discharged by the second battery pack 18.

Figure 6:
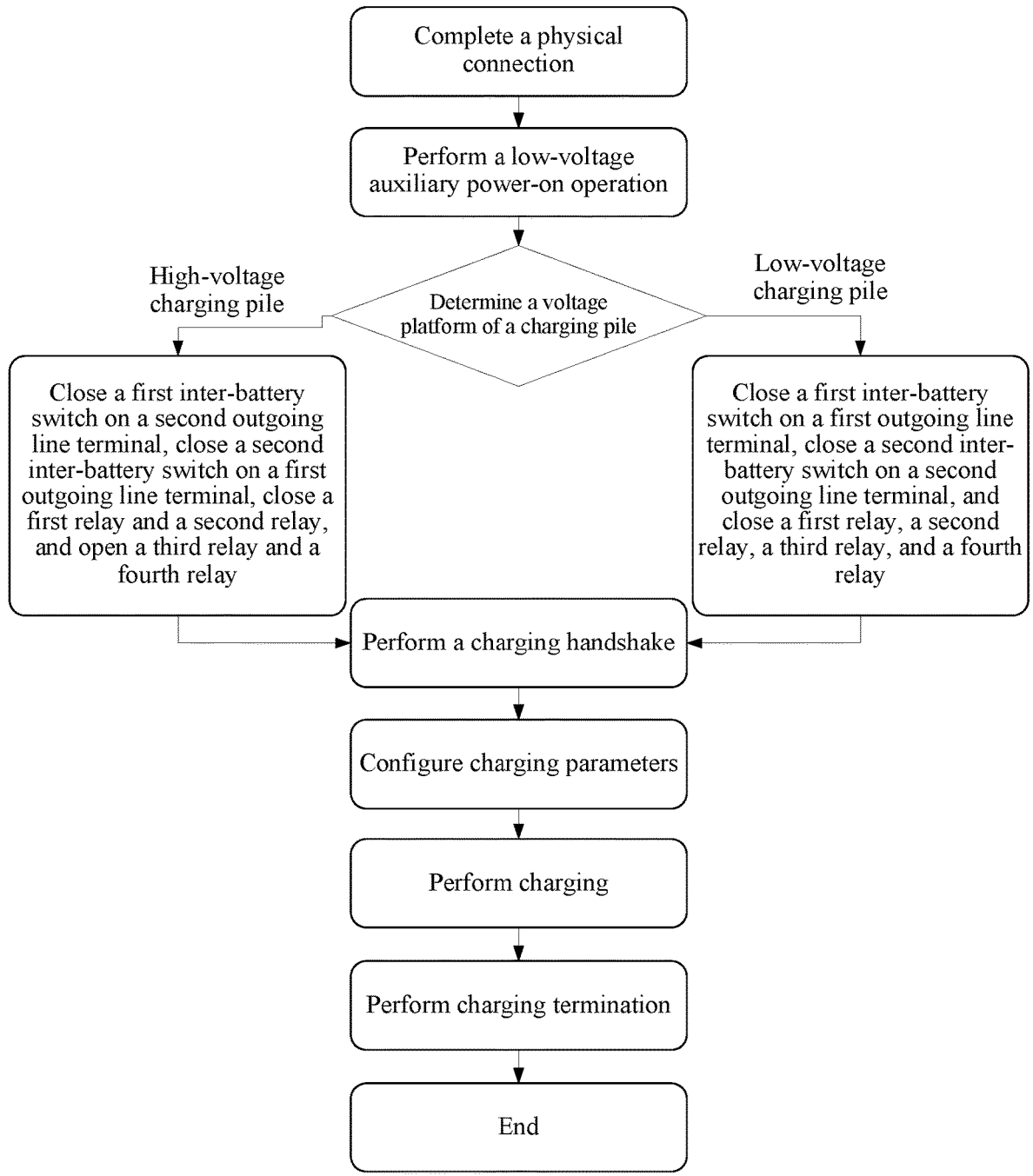
FIG. 6 is a flowchart of a charging and discharging method for a battery system of a vehicle according to an embodiment of the present disclosure.
Figure 7:
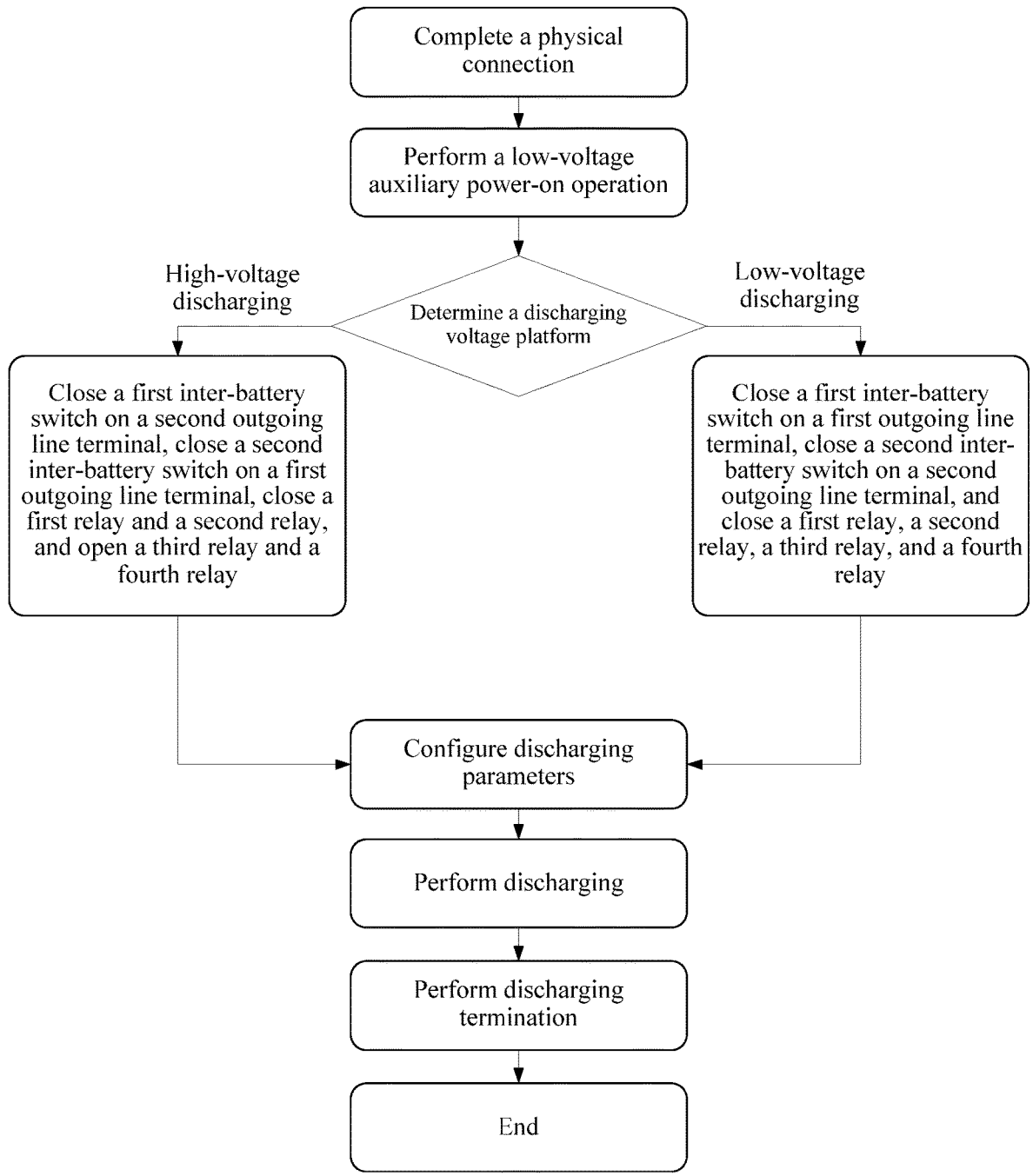
FIG. 7 is a flowchart of another charging and discharging method for a battery system of a vehicle according to an embodiment of the present disclosure.
Figure 8:
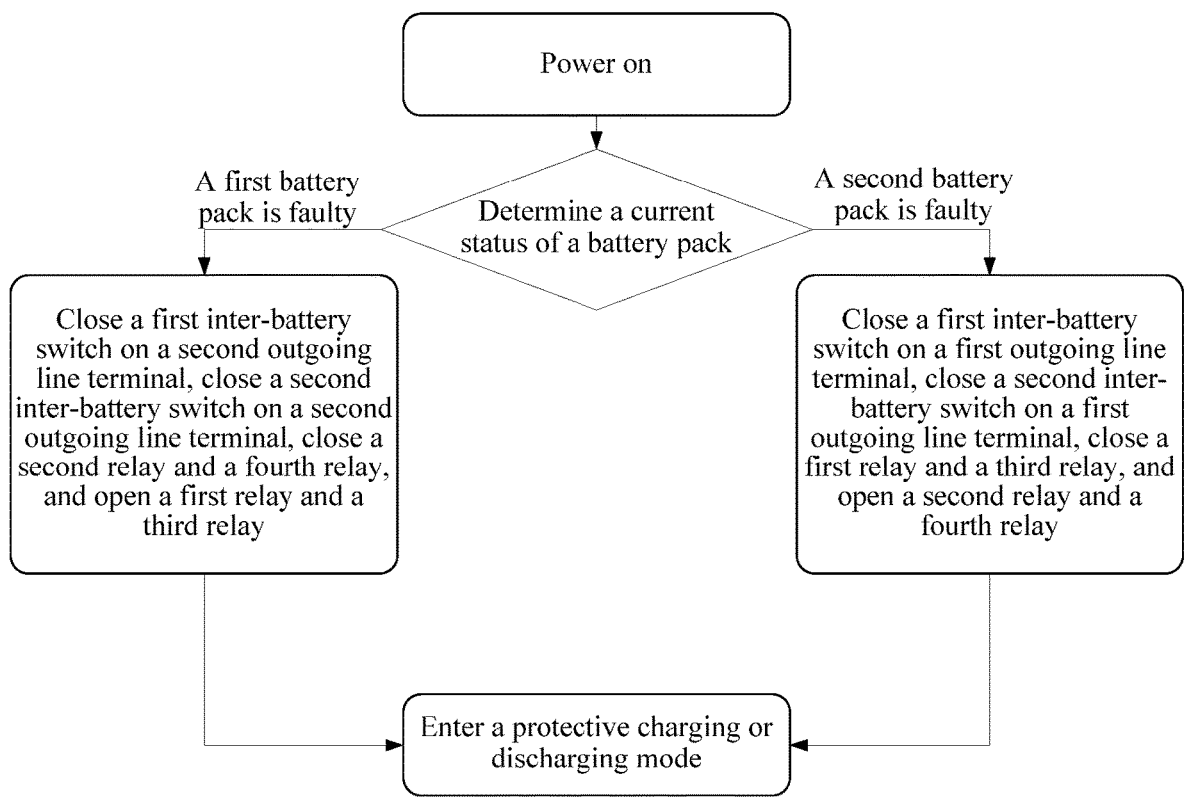
FIG. 8 is a flowchart of still another charging and discharging method for a battery system of a vehicle according to an embodiment of the present disclosure.

FIG. 6 is a flowchart of a charging and discharging method for a battery system of a vehicle according to an embodiment of the present disclosure. FIG. 7 is a flowchart of another charging and discharging method for a battery system of a vehicle according to an embodiment of the present disclosure. FIG. 8 is a flowchart of still another charging and discharging method for a battery system of a vehicle according to an embodiment of the present disclosure. As shown in FIG. 6 to FIG. 8, the present disclosure provides a charging and discharging method applied to the above-described battery system of a vehicle. The method includes:

obtaining working status information of each battery pack; and controlling opening or closing of the inter-battery switch based on received charging and discharging parameter information and a working status, such that the battery pack is charged or discharged in one of a high-voltage charging or discharging mode, a low-voltage charging or discharging mode, and a protective charging or discharging mode.

Based on the above embodiments, in an embodiment of this specification, the inter-battery switch includes the first inter-battery switch 11 and the second inter-battery switch 12, and both the first inter-battery switch 11 and the second inter-battery switch 12 are SPDT switches; and before the controlling opening or closing of the inter-battery switch based on received charging and discharging parameter information and a working status, such that the battery pack is charged or discharged in one of a high-voltage charging or discharging mode, a low-voltage charging or discharging mode, and a protective charging or discharging mode, the method further includes:

obtaining the working status information of each battery pack; and obtaining current position status information corresponding to the first inter-battery switch 11, the second inter-battery switch 12, the first relay 13, and the second relay 14; or obtaining current position status information corresponding to the first inter-battery switch 11, the second inter-battery switch 12, the first relay 13, the second relay 14, the third relay 15, and the fourth relay 16; and controlling opening or closing of the first inter-battery switch 11, the second inter-battery switch 12, the first relay 13, and the second relay 14 based on the received charging and discharging parameter information, the working status information, and the current position status information, such that the battery pack is charged or discharged in one of the high-voltage charging or discharging mode, the low-voltage charging or discharging mode, and the protective charging or discharging mode; or controlling opening or closing of the first inter-battery switch 11, the second inter-battery switch 12, the first relay 13, and the second relay 14, the third relay 15, and the fourth relay 16 based on the received charging and discharging parameter information, the working status information, and the current position status information, such that the battery pack is charged or discharged in one of the high-voltage charging or discharging mode, the low-voltage charging or discharging mode, and the protective charging or discharging mode.

Based on the above embodiments, in an embodiment of this specification, the working status information includes a fault status message, and the charging and discharging parameter information includes a charging pile recognition message; and when a voltage represented by the received charging pile recognition message is equal to a rated voltage of each battery pack, and an obtained working status of a battery pack is the fault status message, the first inter-battery switch 11 and the second inter-battery switch 12 of the battery pack corresponding to the fault status message are controlled to be opened, the first relay 13, the second relay 14, the third relay 15, and the fourth relay 16 are controlled to be closed, and the first inter-battery switch 11 and the second inter-battery switch 12 of each of the other battery packs are controlled to be closed on the first outgoing line terminal 112 and the second outgoing line terminal 113 respectively, such that each fault-free battery pack is connected to the DC charging and discharging interface 2 in parallel, and enters the protective charging mode for charging.

Based on the above embodiments, in an embodiment of this specification, when the voltage represented by the received charging pile recognition message is equal to a sum of rated voltages of all battery packs, and a working status being the fault status message is not obtained for a battery pack, the first relay 13 and the second relay 14 are controlled to be closed, the third relay 15 and the fourth relay 16 are controlled to be opened, and the first inter-battery switch 11 and the second inter-battery switch 12 of each of the other battery packs are controlled to be closed on the second outgoing line terminal 113 and the first outgoing line terminal 112 respectively, such that each battery pack is connected to the DC charging and discharging interface 2 in series, and enters the high-voltage charging mode for charging.

Based on the above embodiments, in an embodiment of this specification, when the voltage represented by the received charging pile recognition message is equal to the rated voltage of each battery pack, and a working status being the fault status message is not obtained for a battery pack, the first relay 13, the second relay 14, the third relay 15, and the fourth relay 16 are controlled to be closed, and the first inter-battery switch 11 and the second inter-battery switch 12 are controlled to be closed on the first outgoing line terminal 112 and the second outgoing line terminal 113 respectively, such that each battery pack is connected to the DC charging and discharging interface 2 in parallel, and enters the low-voltage charging mode for charging.

For example, when a battery system of a vehicle is provided with the first inter-battery switch 11, the second inter-battery switch 12, the first battery pack 17, the second battery pack 18, the first relay 13, the second relay 14, the fifth relay 21, the sixth relay 22, the charging interface, the discharging interface, and the control unit, the control unit can monitor working statuses of each switch, relay, and battery pack.

When the vehicle is charged, after the control unit establishes a physical connection to a charging pile, power can be supplied to the control unit at a low voltage to start the control unit.

After it is determined that insulation detection is normal, the charging pile regularly sends a charger handshake message (CHM) to the control unit every 250 ms. The message may carry a communication protocol version number of the charging pile. After receiving the CHM, the control unit regularly sends a BMS handshake message (BHM) to the charging pile every 250 ms. The message carries a maximum allowable total charging voltage of the control unit. The maximum allowable total charging voltage is a rated voltage of the energy storage apparatus 1.

When the maximum allowable total charging voltage (800 V) is less than or equal to an output voltage (400 V) of the charging pile, a handshake is completed.

The control unit can control opening or closing of the first inter-battery switch 11, the second inter-battery switch 12, the first battery pack 17, the second battery pack 18, the first relay 13, the second relay 14, the fifth relay 21, and the sixth relay 22 based on the output voltage of the charging pile, working status information of the first battery pack 17 and the second battery pack 18, and a position of each relay or inter-battery switch, to realize low-voltage charging based on the output voltage of the charging pile. In this case, the first inter-battery switch 11 is closed on the first outgoing line terminal 112, the second inter-battery switch 12 is closed on the second outgoing line terminal 113, the first relay 13 and the second relay 14 are closed, and the fifth relay 21 and the sixth relay 22 are closed.

During charging, the charging pile can regularly send a charging pile recognition message to the control unit every 250 ms to confirm that a communication link between the charging pile and the control unit is correct. The charging pile recognition message may carry the communication protocol version number of the charging pile.

After receiving the charging pile recognition message, the control unit can regularly send a BRM to the charging pile every 250 ms.

After detecting that each battery pack or the energy storage apparatus 1 is completely charged, the control unit controls the fifth relay 21 and/or the sixth relay 22 to be opened to complete charging.

In a discharging process, there is no handshake between the charging pile and the control unit, and other procedures are the same. Therefore, details are not provided herein again.

According to still another aspect, the present disclosure provides a vehicle. The vehicle is provided with the foregoing battery system of a vehicle in any of the embodiments.

The vehicle is provided with the battery system of a vehicle. Therefore, the vehicle has technical effects of the battery system of a vehicle, and details are not described herein again.

In this specification, the description of "one embodiment", "some embodiments", "an example", "a specific example" or "some examples" means that a specific feature, structure, material or characteristic described in combination with the embodiment(s) or example(s) is included in at least one embodiment or example of the present disclosure. In this specification, the schematic representation of the above terms is not necessarily directed to the same embodiment or example. Moreover, the specific feature, structure, material or characteristic described may be combined in any suitable manner in any one or more embodiments or examples. In addition, different embodiments or examples described in the specification may be joined and combined by a person skilled in the art.

Although the embodiments of the present disclosure have been illustrated and described above, it can be appreciated that the above embodiments are illustrative and should not be construed as a limitation on the scope of the present disclosure. Changes, modifications, and variations can be made to the above embodiments by a person of ordinary skill in the art within the scope of the present disclosure.

The invention claimed is:

1. A battery system of a vehicle, comprising an energy storage apparatus (1) and a direct current (DC) charging and discharging interface (2) that are connected to each other, wherein the energy storage apparatus (1) comprises at least a first battery pack (17) and a second battery pack (18), and an inter-battery switch is disposed between adjacent battery packs; and a first electrode of the DC charging and discharging interface (2) is separately connected to a first electrode of the energy storage apparatus (1) and one terminal of the inter-battery switch, and a second electrode of the DC charging and discharging interface (2) is separately connected to a second electrode of the energy storage apparatus (1) and another terminal of the inter-battery switch;

wherein the inter-battery switch comprises a first inter-battery switch (11) and a second inter-battery switch (12); and an incoming line terminal (111) of the first inter-battery switch (11) is connected to a first electrode of the first battery pack (17), a first outgoing line terminal (112) of the first inter-battery switch (11) is connected to the first electrode of the DC charging and discharging interface (2), and a second outgoing line terminal (113) of the first inter-battery switch (11) is connected to a first outgoing line terminal (112) of the second inter-battery switch (12); and a second outgoing line terminal (113) of the second inter-battery switch (12) is connected to the second electrode of the DC charging and discharging interface (2), and an incoming line terminal (111) of the second inter-battery switch (12) is connected to a second electrode of the second battery pack (18);

wherein the battery system further comprises a first relay (13), one terminal of the first relay (13) is connected to the second electrode of the DC charging and discharging interface (2), and the other terminal of the first relay (13) is separately connected to the second electrode of the energy storage apparatus (1) and a second outgoing line terminal (113) of the second inter-battery switch (12) of each battery pack; or one terminal of the first relay (13) is separately connected to the second electrode of the DC charging and discharging interface (2) and a second outgoing line terminal (113) of the second inter-battery switch (12) of each battery pack, and the other terminal of the first relay (13) is connected to the second electrode of the energy storage apparatus (1);

wherein the battery system further comprises a second relay (14), one terminal of the second relay (14) is connected to the first electrode of the DC charging and discharging interface (2), and the other terminal of the second relay (14) is separately connected to the first electrode of the energy storage apparatus (1) and a first outgoing line terminal (112) of the first inter-battery switch (11) of each battery pack; or one terminal of the second relay (14) is separately connected to the first electrode of the DC charging and discharging interface (2) and a first outgoing line terminal (112) of the first inter-battery switch (11) of each battery pack, and the other terminal of the second relay (14) is connected to the first electrode of the energy storage apparatus (1);

wherein the battery system further comprises a third relay (15), one terminal of the third relay (15) is connected to one terminal of the second relay (14), and the other terminal of the third relay (15) is connected to the first outgoing line terminal (112) of the first inter-battery switch (11); or one terminal of the third relay (15) is connected to the other terminal of the second relay (14), and the other terminal of the third relay (15) is connected to the first outgoing line terminal (112) of the first inter-battery switch (11);

wherein the battery system further comprises a fourth relay (16), one terminal of the fourth relay (16) is connected to one terminal of the first relay (13), and the other terminal of the fourth relay (16) is connected to the second outgoing line terminal (113) of the second inter-battery switch (12); or one terminal of the fourth relay (16) is connected to the other terminal of the first relay (13), and the other terminal of the fourth relay (16) is connected to the second outgoing line terminal (113) of the second inter-battery switch (12);

wherein the DC charging and discharging interface (2) comprises a discharging interface and a charging interface;

a first electrode of the discharging interface is connected to a first electrode of the charging interface; and a second electrode of the discharging interface is connected to a second electrode of the charging interface;

wherein the DC charging and discharging interface (2) further comprises a fifth relay (21); and
one terminal of the fifth relay (21) is connected to the second electrode of the charging interface, and the other terminal of the fifth relay (21) is separately connected to the second electrode of the discharging interface and the second electrode of the energy storage apparatus (1).

2. The battery system of a vehicle according to claim 1, wherein both the first inter-battery switch (11) and the second inter-battery switch (12) are single-pole double-throw (SPDT) switches.

3. The battery system of a vehicle according to claim 2, wherein the DC charging and discharging interface (2) further comprises a sixth relay (22);
one terminal of the sixth relay (22) is connected to the first electrode of the charging interface, and the other terminal of the sixth relay (22) is separately connected to the first electrode of the discharging interface and the first electrode of the energy storage apparatus (1).

4. The battery system of a vehicle according to claim 3, further comprising a control unit, wherein
the control unit is separately connected to the energy storage apparatus (1), the first inter-battery switch (11), the second inter-battery switch (12), the first relay (13), the second relay (14), the third relay (15), the fourth relay (16), the fifth relay (21), and/or the sixth relay (22) to control opening or closing of the first inter-battery switch (11), the second inter-battery switch (12), the first relay (13), the second relay (14), the third relay (15), the fourth relay (16), the fifth relay (21), and/or the sixth relay (22), such that the energy storage apparatus (1) is charged or discharged in one of a high-voltage charging or discharging mode, a low-voltage charging or discharging mode, and a protective charging or discharging mode.

5. The battery system of a vehicle according to claim 4, wherein the control unit comprises a battery detection apparatus;
the battery detection apparatus is connected to each battery pack, and configured to detect a working status of the battery pack; and
the control unit is configured to receive charging and discharging parameter information sent by an external charging and discharging apparatus and working status information sent by the battery detection apparatus, and control opening or closing of the first inter-battery switch (11), the second inter-battery switch (12), the first relay (13), the second relay (14), the third relay (15), the fourth relay (16), the fifth relay (21), and/or the sixth relay (22) based on the charging and discharging parameter information and the working status information, such that the battery pack is charged or discharged in one of the high-voltage charging or discharging mode, the low-voltage charging or discharging mode, and the protective charging or discharging mode.

6. The battery system of a vehicle according to claim 5, wherein the battery detection apparatus is further configured to detect state-of-charge (SOC) information of the battery pack; and
the control unit is configured to detect, based on the SOC information fed back by the battery detection apparatus, whether the battery pack is fully charged, and control the fifth relay (21) and/or the sixth relay (22) to be opened after determining that the battery pack is fully charged.

7. A charging and discharging method applied to the battery system of a vehicle according to claim 6, wherein the method comprises:
obtaining working status information of each battery pack; and
controlling opening or closing of the inter-battery switch based on received charging and discharging parameter information and the working status information, such that the battery pack is charged or discharged in one of a high-voltage charging or discharging mode, a low-voltage charging or discharging mode, and a protective charging or discharging mode.

8. The charging and discharging method applied to the battery system of a vehicle according to claim 7, wherein the inter-battery switch comprises the first inter-battery switch (11) and the second inter-battery switch (12), and both the first inter-battery switch (11) and the second inter-battery switch (12) are SPDT switches; and before the controlling opening or closing of the inter-battery switch based on received charging and discharging parameter information and a working status, such that the battery pack is charged or discharged in one of a high-voltage charging or discharging mode, a low-voltage charging or discharging mode, and a protective charging or discharging mode, the method further comprises:
obtaining current position status information corresponding to the first inter-battery switch (11), the second inter-battery switch (12), the first relay (13), and the second relay (14); and
correspondingly, controlling opening or closing of the first inter-battery switch (11), the second inter-battery switch (12), the first relay (13), and the second relay (14) based on the received charging and discharging parameter information, the working status information, and the current position status information, such that the battery pack is charged or discharged in one of the high-voltage charging or discharging mode, the low-voltage charging or discharging mode, and the protective charging or discharging mode.

9. The charging and discharging method applied to the battery system of a vehicle according to claim 8, wherein the working status information comprises a fault status message, and the charging and discharging parameter information comprises a charging pile recognition message; and
when a voltage represented by the received charging pile recognition message is equal to a rated voltage of each battery pack, and an obtained working status of a battery pack is the fault status message, controlling the first inter-battery switch (11) and the second inter-battery switch (12) of the battery pack corresponding to the fault status message to be opened, controlling the first relay (13) and the second relay (14) to be closed, and controlling the first inter-battery switch (11) and the second inter-battery switch (12) of each of the other battery packs to be closed on the first outgoing line terminal (112) and the second outgoing line terminal (113) respectively, such that each fault-free battery pack is connected to the DC charging and discharging interface (2) in parallel, and enters the protective charging mode for charging.

10. The charging and discharging method applied to the battery system of a vehicle according to claim 9, wherein
when the voltage represented by the received charging pile recognition message is equal to a sum of rated voltages of all battery packs, and a working status being the fault status message is not obtained for a battery pack, controlling the first relay (13) and the second relay (14) to be closed, and controlling the first inter-battery switch (11) and the second inter-battery switch (12) of each of the other battery packs to be closed on the second outgoing line terminal (113) and the first outgoing line terminal (112) respectively, such that each battery pack is connected to the DC charging and discharging interface (2) in series, and enters the high-voltage charging mode for charging.

11. The charging and discharging method applied to the battery system of a vehicle according to claim 9, wherein when the voltage represented by the received charging pile recognition message is equal to the rated voltage of each battery pack, and a working status being the fault status message is not obtained for a battery pack, controlling the first relay (13) and the second relay (14) to be closed, and controlling the first inter-battery switch (11) and the second inter-battery switch (12) to be closed on the first outgoing line terminal (112) and the second outgoing line terminal (113) respectively, such that each battery pack is connected to the DC charging and discharging interface (2) in parallel, and enters the low-voltage charging mode for charging.

12. A vehicle, wherein the vehicle is provided with the battery system of a vehicle according to claim 1.

* * * * *